(12) United States Patent
Nakazawa

(10) Patent No.: US 11,921,235 B2
(45) Date of Patent: Mar. 5, 2024

(54) LIGHT REFLECTION DEVICE, LIGHT GUIDE DEVICE, AND OPTICAL SCANNING DEVICE

(71) Applicant: KAWASAKI JUKOGYO KABUSHIKI KAISHA, Kobe (JP)

(72) Inventor: Mutsuhiro Nakazawa, Kobe (JP)

(73) Assignee: KAWASAKI JUKOGYO KABUSHIKI KAISHA, Kobe (JP)

(*) Notice: Subject to any disclaimer, the term of this patent is extended or adjusted under 35 U.S.C. 154(b) by 318 days.

(21) Appl. No.: 17/594,042

(22) PCT Filed: Mar. 31, 2020

(86) PCT No.: PCT/JP2020/014750
§ 371 (c)(1),
(2) Date: Sep. 30, 2021

(87) PCT Pub. No.: WO2020/204020
PCT Pub. Date: Oct. 8, 2020

(65) Prior Publication Data
US 2022/0155423 A1 May 19, 2022

(30) Foreign Application Priority Data
Apr. 1, 2019 (JP) .................. 2019069626

(51) Int. Cl.
*G01S 17/10* (2020.01)
*G01S 7/481* (2006.01)
(Continued)

(52) U.S. Cl.
CPC ............ *G01S 7/4817* (2013.01); *G01S 17/10* (2013.01); *G02B 26/108* (2013.01);
(Continued)

(58) Field of Classification Search
CPC ...... G01S 17/10; G01S 7/4817; G02B 26/122; G02B 26/108; G02B 26/129; G06K 7/10693
See application file for complete search history.

(56) References Cited

U.S. PATENT DOCUMENTS

| 5,059,779 A | 10/1991 | Krichever et al. |
| 5,200,599 A * | 4/1993 | Krichever ............ G06K 7/1478 235/462.38 |
| 2007/0291487 A1 | 12/2007 | Lee |

FOREIGN PATENT DOCUMENTS

| EP | 0506208 A1 * | 9/1992 | ......... G06K 7/10871 |
| JP | 50-109737 | 8/1975 | |

(Continued)

OTHER PUBLICATIONS

Chad Glinsky, "Rotational Mechanics / Kinematics", https://drivetrainhub.com/notebooks/fundamentals/rotational_mechanics/Chapter 2 - Kinematics.html 2020 (Year: 2020).*

*Primary Examiner* — Maurice C Smith
(74) *Attorney, Agent, or Firm* — Fay Kaplun & Marcin, LLP

(57) ABSTRACT

A light reflection device includes a reflection member having a reflection surface that is formed in a planar shape. The reflection surface reflects incident light. The reflection member performs a revolution and a rotation simultaneously. A direction of the revolution of the reflection member and a direction of the rotation of the reflection member are the same. Angular velocity of the revolution of the reflection member is equal to twice angular velocity of the rotation of the reflection member.

12 Claims, 13 Drawing Sheets

(51) Int. Cl.
*G02B 26/10* (2006.01)
*G02B 26/12* (2006.01)
*G01S 17/89* (2020.01)

(52) U.S. Cl.
CPC ......... *G02B 26/122* (2013.01); *G02B 26/129* (2013.01); *G01S 17/89* (2013.01)

(56) References Cited

FOREIGN PATENT DOCUMENTS

| JP | 1991214278 | 2/1993 | | |
|---|---|---|---|---|
| JP | H09123132 A | * | 5/1997 | ............... B28B 1/28 |
| JP | 2005338730 | 12/2005 | | |
| JP | 2018-97055 | 6/2018 | | |
| JP | 2018-105903 | 7/2018 | | |

* cited by examiner

LIGHT REFLECTION DEVICE, LIGHT GUIDE DEVICE, AND OPTICAL SCANNING DEVICE

TECHNICAL FIELD

The present invention relates mainly to a light reflection device that reflects incident light so as to deflect it.

BACKGROUND ART

Conventionally, a technique for scanning light from a light source along a straight scanning line has been widely used in laser processing devices, image forming devices, and the like. PTL 1 and 2 disclose a device provided in this type of apparatus.

The mirror rotation device of PTL 1 is provided with a light projection means and a light reflection means. The light projection means is provided with a mirror rotation device having a plurality of planar mirrors arranged in a regular polygonal shape. By reflecting light incident in a predetermined direction by one planar mirror in the mirror rotation device which rotates, the planar mirror rotation device radiates the light while moving angularly at a constant angular velocity. The light reflection means reflects the light emitted from the light projection means by a plurality of reflectors and leads the light to an arbitrary irradiated point on a predetermined scanning line.

The polygon mirror rotation device of PTL 2 has a light projection means and a light reflection means. The light projection means has a polygon mirror. Light incident in a predetermined direction is reflected by a reflection surface of each side of a regular polygon included by the polygon mirror which rotates. Accordingly, the polygon mirror radiates the light while moving angularly at a constant angular velocity. The light reflection means reflects the light emitted from the light projection means by a plurality of reflectors and leads the light to an arbitrary irradiated point on a predetermined scanning line.

Regarding the mirror rotation device of PTL 1, the light projection means has only a mirror rotation device. Accordingly, scanning distortion and the like occur due to fluctuations in the reflection position of the light at each planar mirror of the mirror rotation device as the mirror rotation device rotates. Also, regarding the polygon mirror rotation device of PTL 2, the light projection means has only a polygon mirror rotation device. Accordingly, scanning distortion and the like occur due to the fact that the reflection position of the light at each side reflection surface of the regular polygon included by the polygon mirror fluctuates as the polygon mirror rotates.

Therefore, the mirror rotation device of PTL 1 is provided with a reciprocating motion mechanism that sequentially reciprocates the planar mirror, and suppresses the fluctuation of the reflection position of the light by reciprocating the planar mirror. In addition, the polygon mirror rotation device of PTL 2 is provided with a support member that rotatably supports the polygon mirror and a reciprocating motion mechanism that reciprocates the support member. By reciprocating the polygon mirror together with the support member, the reflection position of the light is suppressed from fluctuating.

Also known as the aforementioned apparatus is an apparatus equipped with a mirror galvanometer having a configuration in which a movable part including a reflective mirror performs reciprocating oscillating motion. In this apparatus, the movable part of the mirror galvanometer is oscillated while adjusting its oscillation speed, thereby preventing the reflection position of light from fluctuating.

PRIOR-ART DOCUMENTS

Patent Documents

PTL 1: Japanese patent publication No. 2018-105903
PTL 2: Japanese patent publication No. 2018-97055

SUMMARY OF THE INVENTION

Although the mirror rotation device of PTL 1 and the polygon mirror rotation device of PTL 2 described above can suppress the fluctuation of the reflection position of the light, they cannot prevent it completely. In addition, in the device with the mirror galvanometer, in which the movable part of the mirror galvanometer has to be accelerated and decelerated when oscillates, the scanning area scanned by the device becomes narrower and the processable range of the irradiated object to which the light is irradiated decreases in order to prevent the reflection position of the light from fluctuating.

The present invention relates to preventing the reflection position of light from fluctuating in a device for deflecting light incident in a predetermined direction, without reducing the processable range of an irradiated object to be irradiated by the light.

A first aspect of the present invention provides a light reflection device having the following configuration. That is, the light reflection device comprises a reflection member having a reflection surface that is formed in a planar shape for reflecting incident light. The reflection member performs a rotation and a revolution simultaneously. A direction of the rotation of the reflection member and a direction of the revolution of the reflection member are the same. Angular velocity of the revolution of the reflection member is equal to twice angular velocity of the rotation of the reflection member.

A second aspect of the present invention provides an optical scanning device having the following configuration. That is, the optical scanning device comprises a rotation mirror, a drive unit, and an irradiation device. The drive unit rotates the rotation mirror. The irradiation device irradiates light onto the rotation mirror. The rotation mirror comprises a first regular polygon pyramid and a second regular polygon pyramid. The second regular polygon pyramid is arranged facing the first regular polygon pyramid with an axis coincident with the first regular polygon pyramid. Side surfaces of each of the first regular polygon pyramid and the second regular polygon pyramid are light reflection surfaces each of which is formed in a planar shape. The number of sides of regular polygons is equal in a first base surface that the first regular polygon pyramid has and a second base surface that the second regular polygon pyramid has. The first base surface and the second base surface are both arranged perpendicular to the axis. The first regular polygon pyramid and the second regular polygon pyramid are rotated integrally with each other around the axis as a rotation axis by the drive unit while a phase of the regular polygon of the first base surface and a phase of the regular polygon of the second base surface are matched with each other. A base angle of the first regular polygon pyramid is $\alpha°$ when the first regular polygon pyramid is cut along a plane that includes the axis and a midpoint of one of the sides of the regular polygon of the first base surface. A base angle of the second regular polygon pyramid is $(90-\alpha)°$ when the second regular polygon pyramid is cut along a plane that includes the axis and a midpoint of one of the sides of the regular polygon of the second base surface. A distance between the first base surface and the second base surface is equal to the sum of a distance between the midpoint of one side of the regular polygon of the first base surface and the rotation axis multiplied by tan $\alpha$ and a distance between the midpoint of one side of the regular polygon of the second base surface and the rotation axis multiplied by tan(90–$\alpha$). The irradiation device irradiates the light toward a position so that the light intersects the rotation axis of the rotation mirror.

As a result, the reflection position of the light relative to the incident light is constant in regards to the reflection member, and thus the reflection position of the light is prevented from fluctuating. Therefore, distortion can be prevented when scanning is performed.

According to the present invention, in the light reflection device that deflects light incident in a predetermined direction, it is possible to prevent a reflection position of the light from fluctuating.

DETAILED DESCRIPTION

Figure 1:
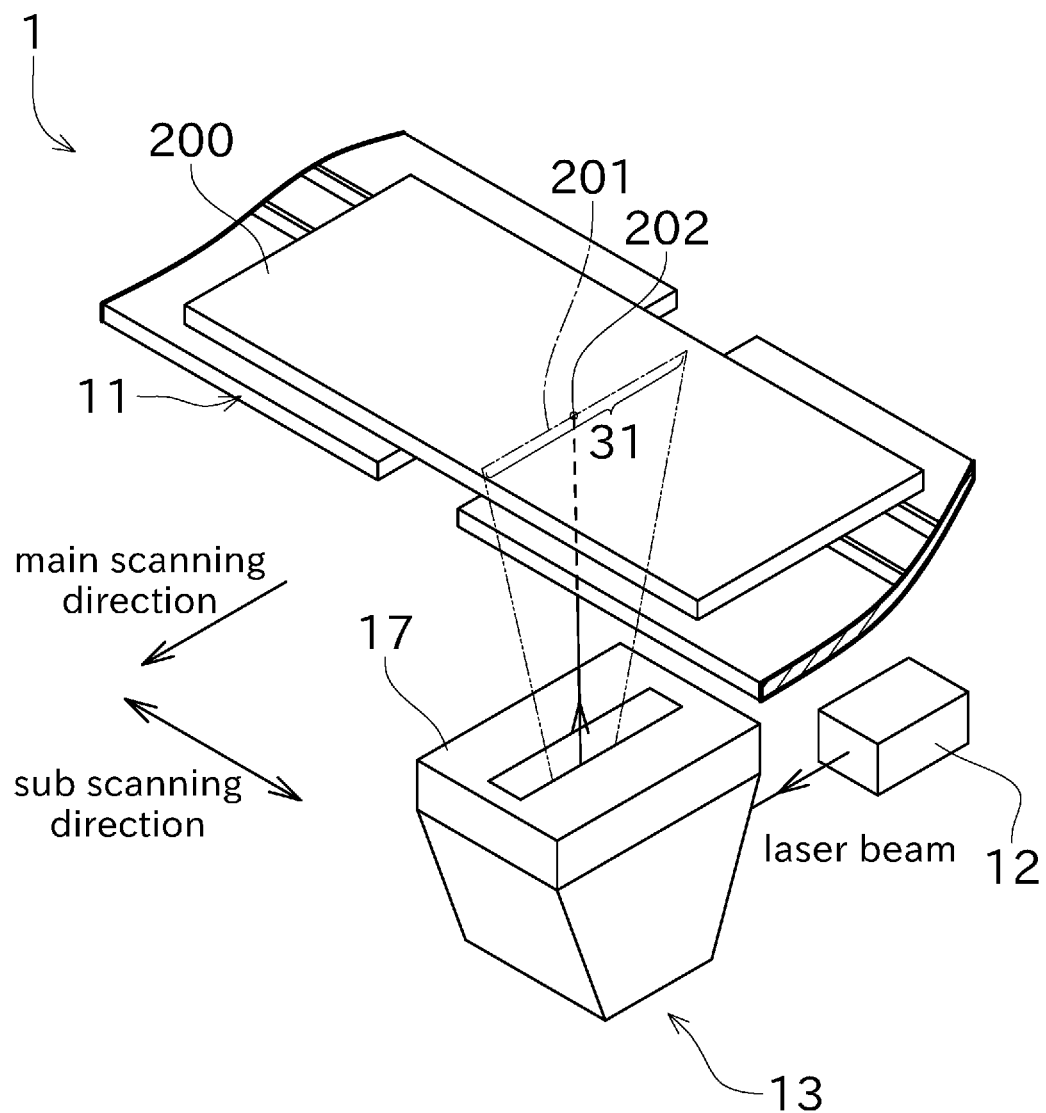
FIG. 1 is a diagonal view of a laser processing device comprising a light guide device according to a first embodiment of the present invention.

Next, an embodiment of the present invention will be described with reference to the drawings. Initially, referring to FIG. 1, a configuration of a laser processing device (optical scanning device) 1 comprising a light guide device 13 according to a first embodiment of the present invention will be described. FIG. 1 is a diagonal view of the laser processing device 1.

The laser processing device 1 shown in FIG. 1 can process a workpiece 200 by irradiating a laser beam onto the workpiece (object to be irradiated) 200 while scanning the workpiece 200 by light.

In the present embodiment, the laser processing device 1 can perform non-thermal processing. For example, the non-thermal processing includes ablation processing. The ablation processing is a processing in which a part of the workpiece 200 is vaporized by irradiating a laser beam to the part of the workpiece 200. The laser processing device 1 may be configured to perform thermal processing in which the workpiece 200 is melted by the heat of the laser beam.

The workpiece 200 is a plate-like member. The workpiece 200 is made of, for example, CFRP (carbon fiber reinforced plastic). The workpiece 200 is not limited to a plate-like member, and may be, for example, a block-like member. Also, the workpiece 200 may be made of other materials.

The laser beam used in the laser processing device 1 may be visible light or electromagnetic waves in a wavelength band other than visible light. In this embodiment, not only visible light but also various electromagnetic waves with a wider wavelength band than that are included and referred to as "light".

As shown in FIG. 1, the laser processing device 1 includes a conveyance section 11, a laser generator 12, a light guide device 13.

The conveyance section 11 can move the workpiece 200 in a direction (sub scanning direction) that is substantially orthogonal to a main scanning direction of the laser processing device 1. Laser processing is performed while the workpiece 200 is moved by the conveyance section 11.

In this embodiment, the conveyance section 11 is a belt conveyor. The conveyance section 11 is not particularly limited. The conveyance section 11 may be a roller conveyor, or may be a configuration in which the workpiece 200 is grasped and conveyed. Also, the conveyance section 11 can be omitted and processing can be performed by irradiating the laser beam to the workpiece 200 which is fixed so as not to move.

The laser generator 12 is a light source of the laser beam and can generate a pulsed laser with a short time width by pulse oscillation. The time width of the pulsed laser is not particularly limited. The time width is a short time interval such as a nanosecond order, a picosecond order, or a femtosecond order, for example. The laser generator 12 may be configured to generate a CW laser by continuous wave oscillation.

The light guide device 13 guides the laser beam generated by the laser generator 12 to irradiate the workpiece 200. The laser beam guided by the light guide device 13 is irradiated to an irradiated point 202 on a scanning line 201 defined on the surface of the workpiece 200. As will be described in detail below, the light guide device 13 causes the irradiated point 202, to which the workpiece 200 is irradiated by the laser beam, to move at a substantially constant speed along the straight scanning line 201. In this way, the light scanning is realized.

Figure 2:
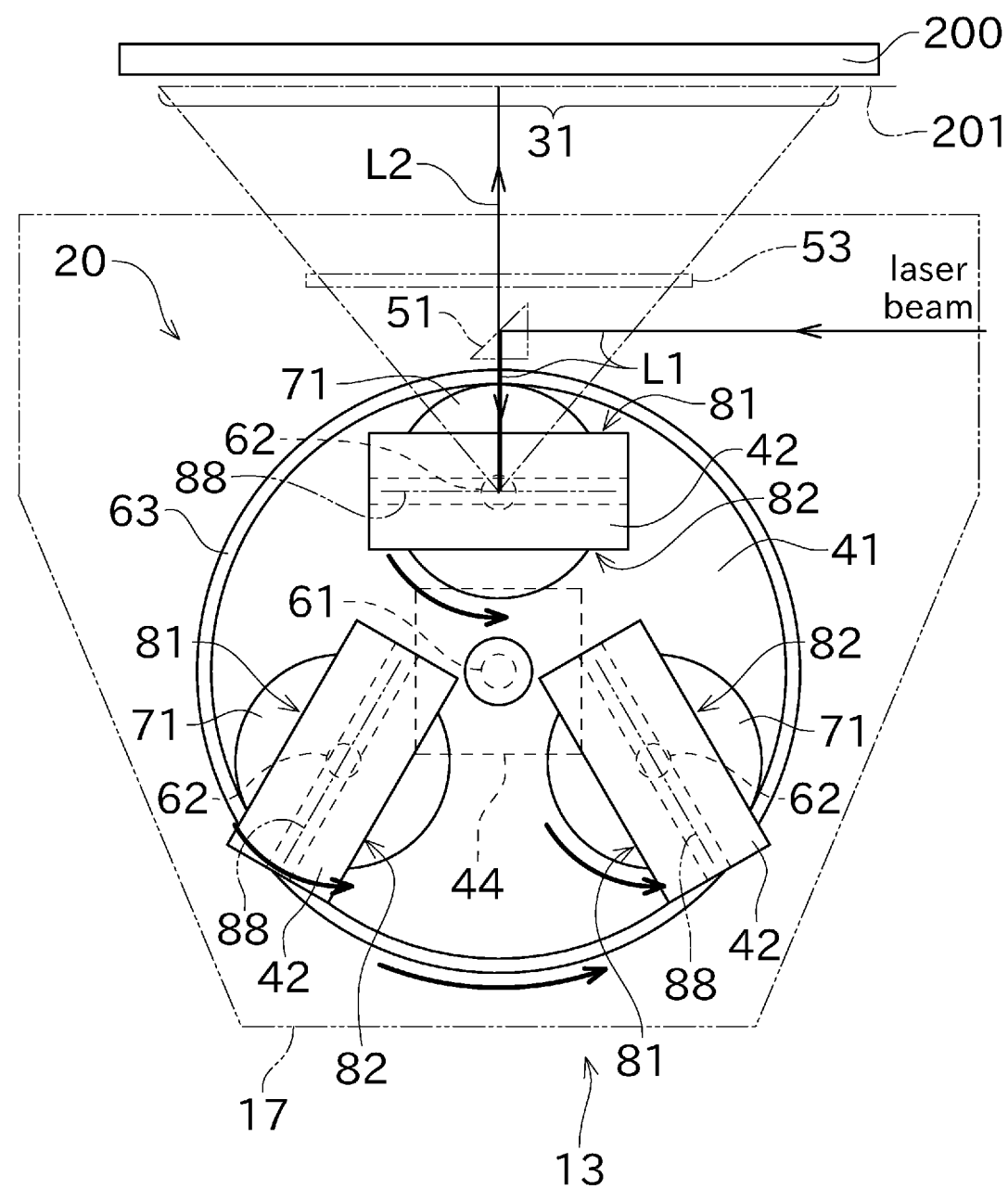
FIG. 2 is a schematic view of an example in which the light guide device includes a single reflection unit.

Next, referring to FIG. 2, the light guide device 13 will be described in detail. FIG. 2 is a schematic view of the light guide device 13.

As shown in FIG. 2, the light guide device 13 includes at least one reflection unit (light reflection device) 20. In this embodiment, the light guide device 13 has one reflection unit 20. The reflection unit 20 is disposed inside a housing 17 included by the light guide device 13.

When the laser beam emitted from the laser generator 12 enters into the reflection unit 20, the reflection unit 20 reflects the laser beam so as to guide the laser beam to the workpiece 200. The laser beam incident from the laser generator 12 to the reflection unit 20 is hereinafter referred to as incident light. The reflection unit 20 is placed so as to be separated from the workpiece 200 by a predetermined distance.

The reflection unit 20 can scan optically by reflecting and deflecting the incident light. FIG. 1 and FIG. 2 show a scanning area 31, which is an area in which the workpiece 200 is optically scanned by the reflection unit 20. The scanning area 31 constitutes a scanning line 201. The scanning area 31 is scanned by the reflection unit 20.

Figure 3:
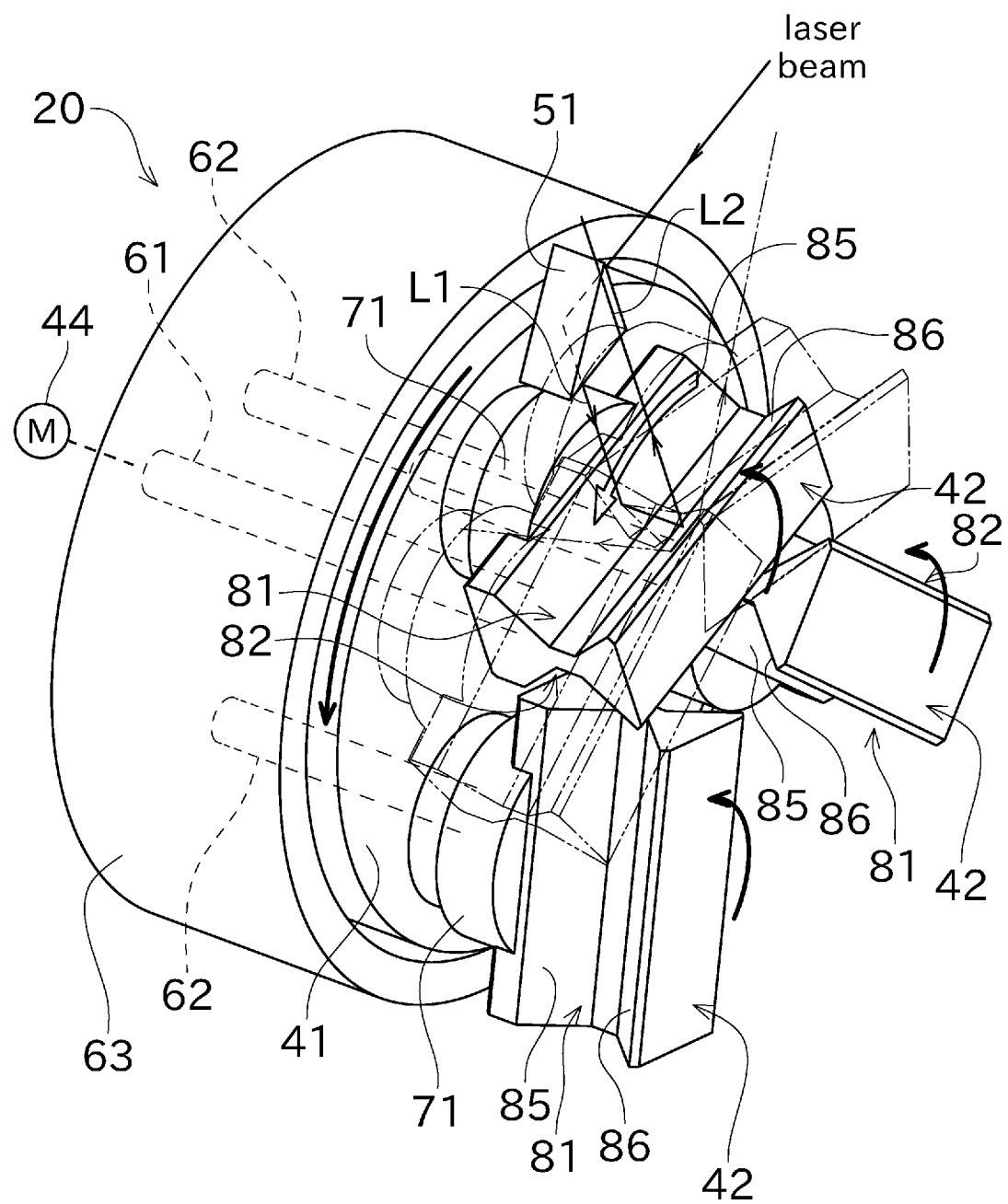
FIG. 3 is a diagonal view of the reflection unit.
Figure 4:
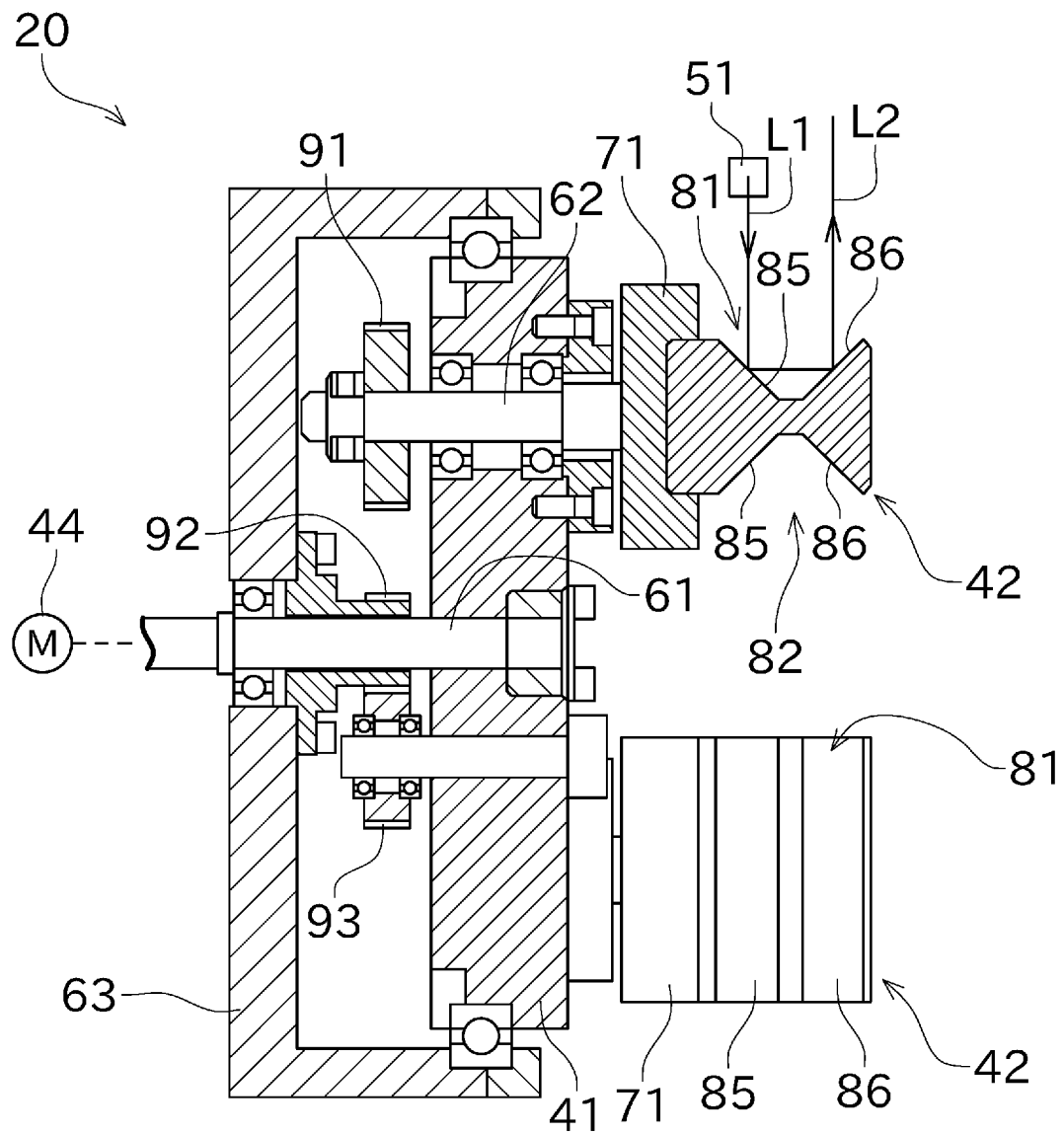
FIG. 4 is a cross-sectional view of the reflection unit.

Next, referring to FIGS. 2 to 4, the reflection unit 20 will be described in detail. FIG. 3 is a diagonal view of the reflection unit 20. FIG. 4 is a cross-sectional view of the reflection unit 20.

As shown in FIG. 2, the reflection unit 20 includes a support plate (support member) 41, reflection members 42, a motor 44, a prism 51, and a scanning lens 53.

The support plate 41 is a disc-shaped member and is rotatable with respect to a housing 63 described below. A first rotation shaft 61 is rotatably supported by the housing 63. The support plate 41 is fixed to an axial end of the first rotation shaft 61. An output shaft of the motor 44 is connected to the other end of the first rotation shaft 61 in the axial direction.

As shown in FIG. 4, the reflection unit 20 includes a housing 63 in which the drive transmission mechanism of the reflection unit 20 is housed. The housing 63 is fixed at a suitable location on the housing 17 shown in FIG. 2.

The housing 63 is formed in a hollow cylindrical shape with one axial side open. The support plate 41 is located so as to close the open side of the housing 63. The first rotation shaft 61 is disposed so as to penetrate the housing 63.

Each of the reflection members 42 is a member formed in a block shape. The reflection member 42 is rotatable with respect to the support plate 41. Second rotation shafts 62 are rotatably supported by the support plate 41. Each of the second rotation shafts 62 is directed parallel to the first rotation shaft 61 and is arranged to penetrate the support plate 41.

The reflection member 42 is supported by the support plate 41 via a base portion 71 and the second rotation shaft 62.

The base portion 71 is formed in a small disc shape as shown in FIG. 3. The base portion 71 is fixed to one end of the second rotation shaft 62 in the axial direction as shown in FIG. 4. The other end of the second rotation shaft 62 in the axial direction is located inside the housing 63.

The above-described reflection member 42 is fixed to the base portion 71. Accordingly, the reflection member 42 can rotate together with the base portion 71 and the second rotation shaft 62.

The reflection members 42 can orbit around the first rotation shaft 61 together with the support plate 41 (revolution). At the same time, the reflection members 42 can rotate around the second rotation shaft 62 (rotation). In the following, the axial center of the first rotation shaft 61 may be referred to as a revolution axis, and the axial center of each of the second rotation shafts 62 may be referred to as a rotation axis. The drive mechanism of the reflection members 42 will be described later.

In the present embodiment, three reflection members 42 are provided. The three reflection members 42 are disposed on a surface in a side of the support plate 41 that is far from the housing 63.

As shown in FIG. 2, the three reflection members 42 are located in the support plate 41 so as to equally divide a circle having the first rotation shaft 61 as a center. Specifically, the three reflection members 42 are disposed at equal intervals (120° intervals) in the circumferential direction of the support plate 41.

Each of the reflection members 42 reflects light so as to guide it to the scanning area 31. As shown in FIG. 4, the reflection member 42 has a first reflector 81 and a second reflector 82. The first reflector 81 and the second reflector 82 are arranged in pairs across the second rotation shaft 62 (rotation axis).

To explain concretely, the reflection member 42 is formed in a rectangular block shape. In this reflection member 42, the first reflector 81 is disposed on one of two opposing surfaces across the rotation axis, and the second reflector 82 is disposed on the other surface. The first reflector 81 and the second reflector 82 are formed symmetrically with respect to each other.

As will be described in detail below, angular speed of rotation of the support plate 41 is driven to be equal to twice angular speed of rotation of the reflection member 42. Accordingly, while the support plate 41 rotates 360°, the reflection member 42 rotates 180°.

When viewing the reflection member 42 along the rotation axis, the first reflector 81 and the second reflector 82 are arranged to face opposite sides of each other.

Figure 5:
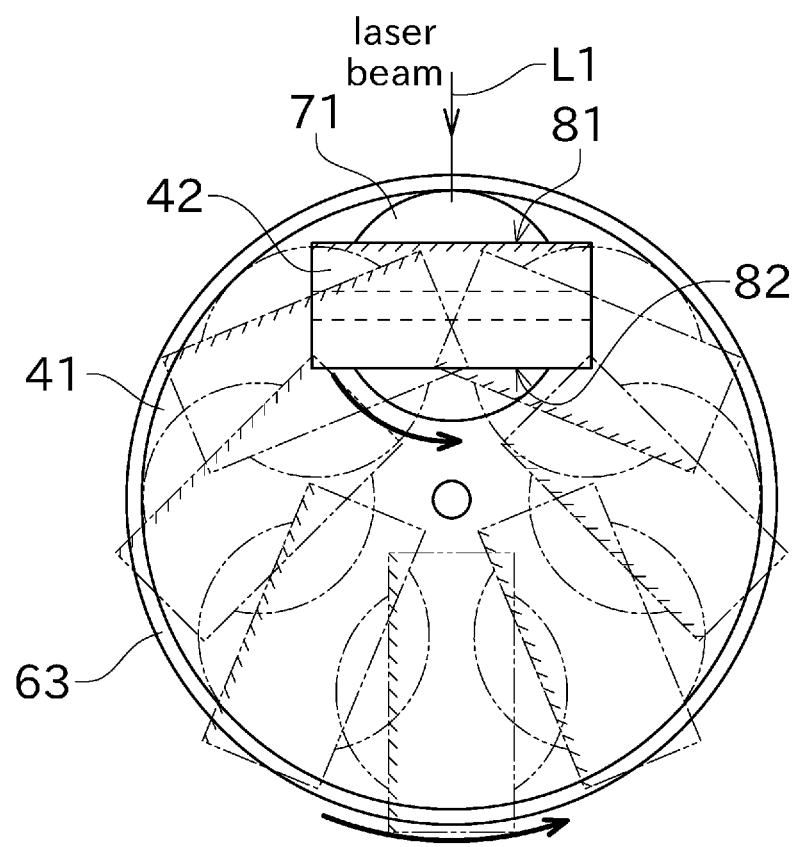
FIG. 5 is a diagram illustrating a rotation 180° of the reflection member while a revolution 360°.

FIG. 5 depicts the revolution and the rotation of the reflection member 42 when attention is focused on only one of the three reflection members 42. To make the orientation of the reflection member 42 easier to understand, in FIG. 5, an edge portion of the reflection member 42 on the side close to the first reflector 81 is drawn in a form with hatching. In FIG. 5, the direction of the revolution and the direction of the rotation of the reflection member 42 are both counterclockwise.

As shown in FIG. 5, the reflection member 42 rotates 180° in conjunction with the 360° rotation of the support plate 41. Accordingly, every time the reflection member 42 revolves 360°, it rotates 180° and the orientation of the first reflector 81 and the second reflector 82 are swapped. Thus, for each 360° rotation of the support plate 41, the surface on which the incident light is reflected is alternately switched between the first reflector 81 and the second reflector 82.

The first reflector 81 and the second reflector 82 each have a first reflection surface 85 and a second reflection surface 86. The configurations of the first reflector 81 and the second reflector 82 are substantially identical to each other. Therefore, the configuration of the first reflector 81 will be described below as representative.

To explain concretely, a cross-sectional V-shaped groove is formed in the reflection member 42 to make the side far from the rotation axis open. The longitudinal direction of the groove is directed perpendicular to the rotation axis. The first reflection surface 85 and the second reflection surface 86 are formed on the inner wall of this groove. The first reflector 81 is made of the first reflection surface 85 and the second reflection surface 86.

The first reflection surface 85 and the second reflection surface 86 are both formed in a planar shape. The first reflection surface 85 is disposed inclined with respect to a virtual plane perpendicular to the second rotation shaft 62. The second reflection surface 86 is disposed inclined with respect to a virtual plane perpendicular to the second rotation shaft 62.

Figure 6:
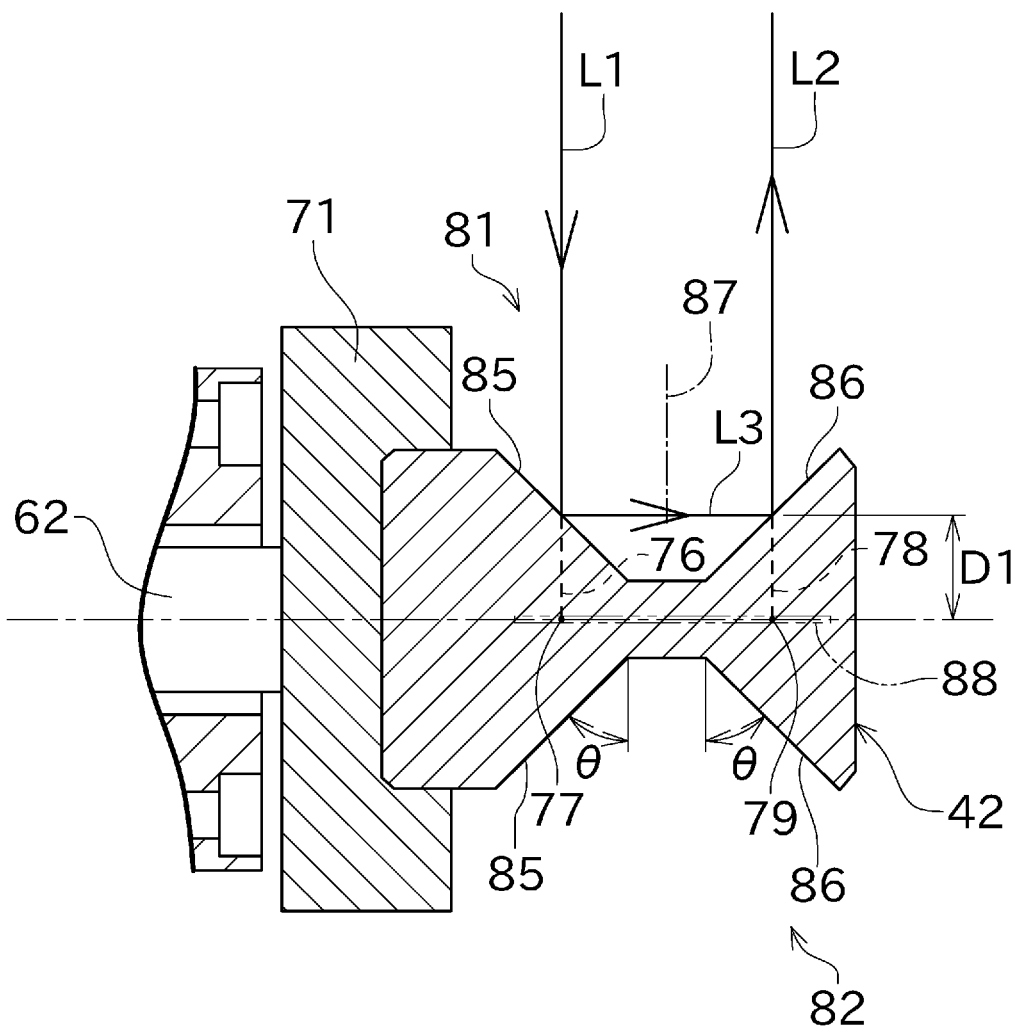
FIG. 6 is a diagram illustrating the reflection of incident light by the reflection member.

As shown in FIG. 6, the first reflection surface 85 and the second reflection surface 86 are inclined with respect to a virtual plane perpendicular to the second rotation shaft 62 in opposite directions and at an angle θ (specifically, 45°) equal to each other. Accordingly, the first reflection surface 85 and the second reflection surface 86 are symmetrical with respect to a symmetry plane 87 perpendicular to the second rotation shaft 62. The first reflection surface 85 and the second reflection surface 86 are arranged to form a V-shape with an angle of 90°.

With this configuration, the incident light guided into the light guide device 13 is bent by the prism 51 and travels along a first light path L1 in a direction approaching the reflection unit 20. The first light path L1 is orthogonal to the direction of the revolution axis of the reflection member 42.

The three reflection members 42 are driven by the motor 44 to perform the revolution and the rotation, thereby moving across the first light path L1 in sequence. Accordingly, the three reflection members 42 hit the incident light along the first light path L1 in order and reflect the light.

Around the timing when the reflection member 42 which revolves is closest to the upstream side of the first light path L1, the first reflection surface 85 that belongs to the first reflector 81 or the second reflector 82 is positioned to overlap with the first light path L1 as shown in FIG. 3. Accordingly, the incident light is reflected by the first reflection surface 85, and then reflected by the second reflection surface 86.

When the reflection member 42 performs the revolution and the rotation with being hit by the incident light as shown in FIG. 4, the directions of the first reflection surface 85 and the second reflection surface 86 change continuously. Accordingly, the direction of the light emitted from the second reflection surface 86 smoothly changes as shown by the white arrow in FIG. 3. Thus, a deflection of the emitted light is realized.

Since the first reflection surface 85 and the second reflection surface 86 are arranged in a V-shape, as the reflection member 42 performs the revolution and the rotation, the emitted light from the reflection member 42 is deflected along a plane perpendicular to the rotation axis. This plane is offset in the direction of the second rotation shaft 62 (in other words, in the direction of the first rotation shaft 61) with respect to the first light path L1. This allows the light reflected by the second reflection surface 86 to be directed to the workpiece 200 through a second optical path L2, which is offset with respect to the first light path L1.

The incident light enters into the reflection unit 20 in a direction perpendicular to the rotation axis and the revolution axis. When a phase of the revolution of the reflection member 42 is completely coincident with the direction of the incident light, the first reflection surface 85 and the second reflection surface 86 are orthogonal to the incident light when viewed along the second rotation shaft 62. Accordingly, at this time, the incident light is reflected twice by the reflection member 42 so as to be folded back as shown in FIG. 3, and is emitted along the second light path L2 which is parallel and opposite to the direction of the first light path L1.

Thus, the incident light is deflected by being reflected by the first reflection surface 85 and the second reflection surface 86. Here, as shown in FIG. 6, a mirror image of the symmetry plane 87 about the first reflection surface 85 and a mirror image of the symmetry plane 87 about the second reflection surface 86 are considered. Both of the two mirror images equal to a plane 88 located inside the reflection member 42. From the viewpoint of light path length, the case where the incident light is reflected with offset by the first reflection surface 85 and the second reflection surface 86 and the case where the incident light is reflected without offset by the plane 88 are equivalent. In this sense, the virtual plane 88 described above can be said to be an apparent reflection surface.

The plane 88 will now be described from another aspect. In the following, a light path from a point at which the incident light is reflected by the first reflection surface 85 to a point at which it is reflected by the second reflection surface 86 is referred to as an intermediate light path L3. The bisector point of the intermediate light path L3 is located on the symmetry plane 87.

As shown by the dashed line in FIG. 6, consider the case where the first light path L1 of the incident light is extended from the first reflection surface 85 to plunge into the inside of the reflection member 42. A point 77 at the end of an extension line 76, which extends the first light path L1 of the incident light by a length D1, which is half the length of the intermediate light path L3, is located on the plane 88.

Similarly, consider the case where the second light path L2 of the incident light is extended from the second reflection surface 86 to plunge into the inside of the reflection member 42. A point 79 at the end of an extension line 78, which extends the second light path L2 of the incident light by the length D1, which is half the length of the intermediate light path L3, is located on the plane 88.

FIG. 6 shows a state in which the direction of the second light path L2 is the center of the deflection angle range. However, no matter in which direction the incident light is deflected by the reflection member 42, the ends of the extension lines 76, 78 are always located in the plane 88.

This plane 88 is also the plane of reference in which the first reflector 81 and the second reflector 82 are symmetrically arranged. Accordingly, although the plane 88 is shown in FIG. 6 in relation to the first reflector 81, the plane 88 is common to both the first reflector 81 and the second reflector 82. And in the present embodiment, the rotation axis of the reflection member 42 (in other words, the axial center of the second rotation shaft 62) is arranged to be included in this plane 88.

Accordingly, deflecting the incident light at the first reflector 81 and the second reflector 82 of the reflection member 42 is substantially the same as deflecting the incident light by reflection surfaces arranged on the front and back sides of the zero-thickness plane 88 that performs the rotation and the revolution integrally with the reflection member 42. FIG. 2 illustrates the relationship between the reflection member 42 which rotates and revolves and the plane 88.

The prism 51 comprises a suitable optical element. The prism 51 is disposed at an upstream side of the first light path L1 than the reflection member 42. The prism 51 allows the laser beam from the laser generator 12 to be guided to the reflection member 42.

The scanning lens 53 is a free-form surface lens, for example, a known fθ lens can be used. The scanning lens 53 is disposed between the reflection member 42 and the scanning area 31. By this scanning lens 53, a focal distance can be made constant in the center and the peripheral portions of the scanning area.

The motor 44 generates a driving force for the revolution and the rotation of the reflection member 42. The driving force of the motor 44 is transmitted to a planetary gear train through the output shaft of the motor 44, thereby rotating the support plate 41 and the reflection members 42. The motor 44 is an electric motor in this embodiment, but is not limited thereto.

Figure 7:
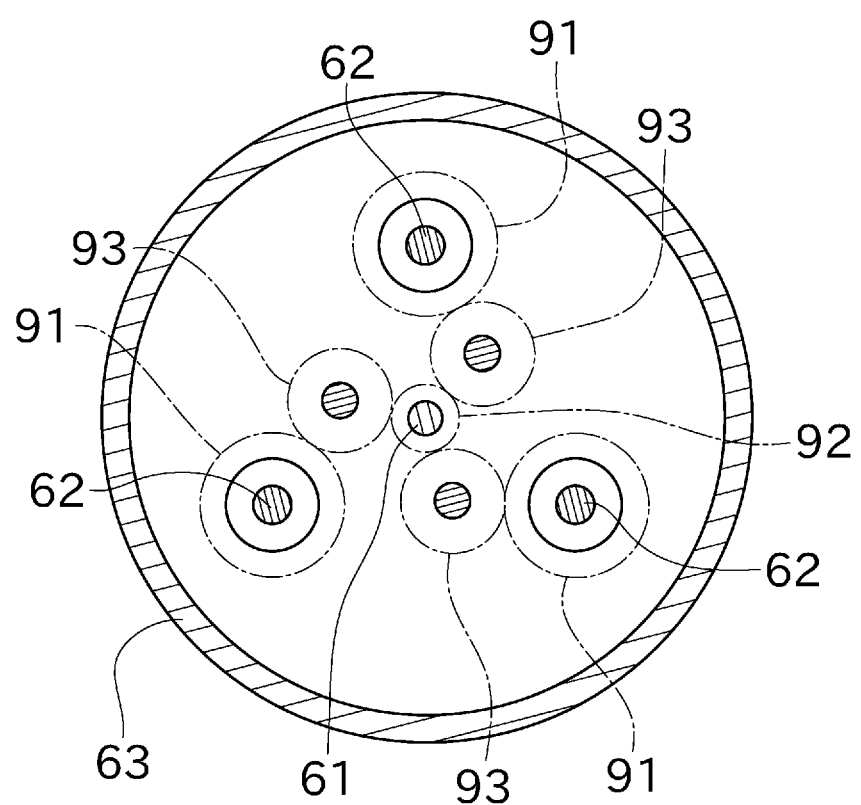
FIG. 7 is a cross-sectional view of the reflection unit cut along a plane perpendicular to a revolution axis of the reflection member.

Next, referring to FIGS. 4 and 7, a drive mechanism for rotating the support plate 41 and the reflection members 42 will be described. FIG. 7 is a cross-sectional view of the reflection unit 20 cut along a plane perpendicular to the revolution axis.

As shown in FIG. 4, the center of the support plate 41 is fixed to an axial end of the first rotation shaft 61. The output shaft of the motor 44 is connected to the other end of the first rotation shaft 61 in the axial direction.

Second rotation shafts 62 are disposed at positions radially outside the center of the support plate 41. Each of the second rotation shafts 62 is rotatably supported by the support plate 41. An axial end portion of the second rotation shaft 62 is disposed outside the housing 63 and is fixed to the base portion 71. The other axial end portion of the second rotation shaft 62 in the axial direction is disposed inside the housing 63.

As shown in FIG. 7, a planetary gear 91 is fixed to each of the second rotation shafts 62 inside the housing 63. The planetary gears 91 are coupled with a sun gear 92 provided around the first rotation shaft 61 via counter gears 93. The sun gear 92 is fixed to the housing 63. Each of the counter gear 93 is rotatably supported by the support plate 41.

As a result, when the motor 44 is driven, the driving force of the motor 44 is transmitted to the first rotation shaft 61, causing the support plate 41 to rotate. The rotation of the support plate 41 causes the shafts of the counter gears 93 and the shafts of the planetary gears 91 (the second rotation shafts 62) to move around the sun gear 92. At this time, the counter gears 93 meshing with the sun gear 92 rotate, and the planetary gears 91 meshing with the counter gear 93 also rotate. Accordingly, the reflection members 42, which are fixed to the planetary gears 91 via the second rotation shafts 62, perform the revolution and the rotation simultaneously.

The sun gear 92 is fixed to the housing 63 and the counter gears 93 are interposed between the planetary gears 91 and the sun gear 92. Accordingly, a direction of rotation of the support plate 41, which is a planetary carrier, and a direction of rotation of the second rotation shafts 62 (the reflection members 42) are in the same direction. In addition, the number of teeth of each of the planetary gears 91 is twice the number of teeth of the sun gear 92. As a result, the revolution angular velocity of the reflection member 42 is equal to twice the rotation angular velocity of the reflection member 42.

Next, with reference to FIG. 8, the relationship between the revolution angular velocity and the rotation angular velocity of the reflection members 42 will be described in detail.

Figure 8:
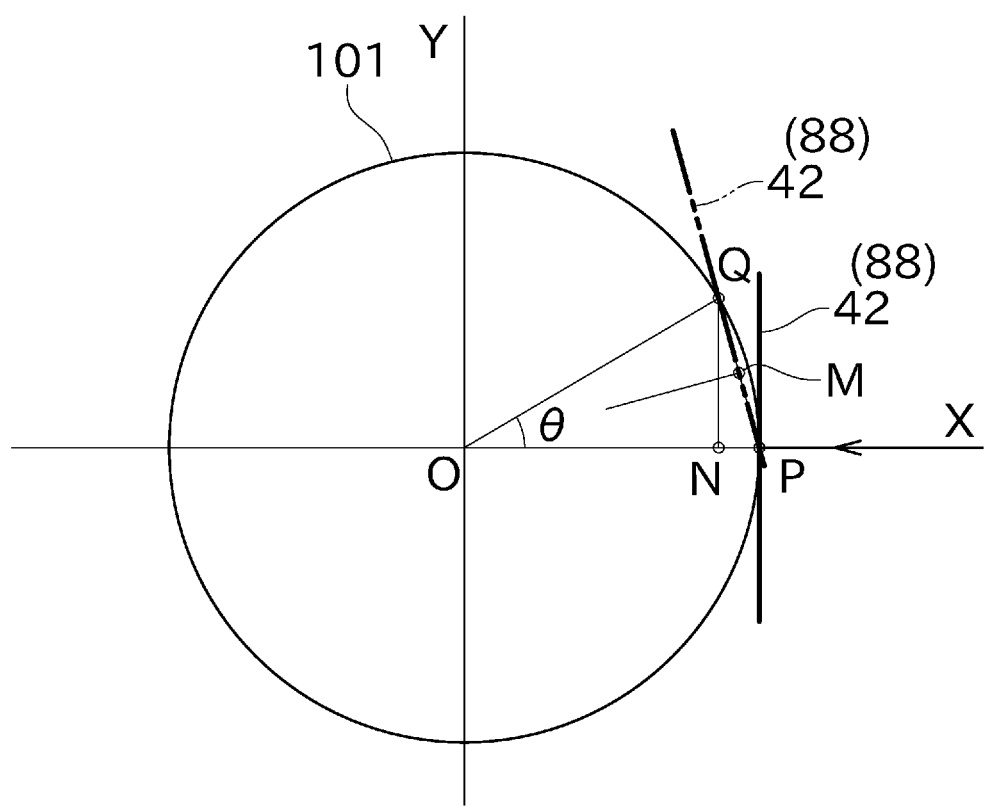
FIG. 8 is a diagram illustrating a relationship between a position at which the incident light hits the reflection member and angles of the revolution and the rotation.

In FIG. 8, a trajectory of the second rotation shaft 62 associated with the rotation of the support plate 41 is shown as a revolution circle 101. The center of the revolution circle 101 is located at an intersection point (origin O) of the X-axis and the Y-axis extending in a direction perpendicular to each other. The origin O corresponds to the revolution axis of the reflection members 42. As described above, the deflection of the light at the reflection member 42 can be considered to be substantially the same as the deflection by reflecting the light at the aforementioned plane 88. Accordingly, in FIG. 8, the reflection member 42 is represented by a straight line indicating the plane 88, which is an equivalent virtual reflection surface.

The rotation axis of the reflection member 42 is located at an arbitrary point on the revolution circle 101. Here, consider a state in which the rotation axis of the reflection member 42 is at the position of a point P and the orientation of the reflection surface of the reflection member 42 is perpendicular to the X-axis. At this state, light incident toward the origin O in the direction of the X-axis is reflected by the reflection member 42 at the point P. When viewed two-dimensionally as shown in FIG. 8, the light path of the reflected light matches the light path of the incident light.

Suppose that the position of the rotation axis of the reflection member 42 changes by an angle θ and moves from the point P to a point Q as the support plate 41 rotates. To ensure that the point at which the incident light hits the reflection member 42 does not change from the point P, even if the reflection member 42 revolves in this manner, consider what the angle of the rotation of the reflection member 42 must be in relation to the angle of the revolution.

In order for the incident light to be reflected at the point P even if the rotation axis of the reflection member 42 is at the point Q, the orientation of the reflection member 42 must match an orientation of the line drawn from the point Q to the point P.

The midpoint of a straight line connecting the point P and the point Q is defined as M. Also, consider a straight line passing through the point Q and extending parallel to the Y-axis, and the intersection point of this line with the X-axis is defined as N.

Since the points P and Q are both on the circumference of the revolution circle 101, the triangle OPQ is an isosceles triangle. Therefore, the angle OPM formed by the line OP and the line PM is equal to the angle OQM formed by the line OQ and the line QM. The straight line OM and the straight line PQ are orthogonal. Also, the straight line OP is orthogonal to the straight line QN.

If we focus on the triangle OQM and the triangle NQP, the two angles of the triangle are equal to each other as described above. Therefore, triangle OQM and triangle NQP are geometrically similar.

Therefore, the angle QOM, formed by the line QO and the line OM, is equal to the angle PQN, formed by the line PQ and the line QN. The angle QOP formed by the straight line QO and the straight line OP is θ. Therefore, the angle QOM is θ/2 and the angle PQN is also θ/2.

From this result, it can be seen that if the reflection member 42 performs the revolution and the rotation simultaneously so that the revolution angular velocity is twice the rotation angular velocity, the length of the optical path can be kept constant because the reflection member 42 crosses the light path so that it always hits the incident light at point P.

Thus, in the present embodiment, the incident light is reflected and deflected by rotating the reflective member 42 having the reflection surfaces 85, 86. The reflection member 42 is rotatably driven at constant angular velocity and does not perform a reciprocating motion (acceleration/deceleration) like a mirror galvanometer. Accordingly, it is possible to avoid narrowing the scanning area 31 in which the movement speed of the irradiated point 202 can be constant, and to suppress a decrease in a processable range of the workpiece 200 by the light. Further, the combination of the revolution and the rotation of the reflection members 42 can prevent the fluctuations of the point at which the reflection member 42 hits the incident light. Therefore, the light can be guided to the scanning lens 53 in an ideal state in the same way as with the mirror galvanometer. Thus, it is possible to obtain a light reflection device having both a high irradiation rate, which is an advantage of a polygon mirror, and a resistance in reflection point fluctuation, which is an advantage of a mirror galvanometer.

As described above, the reflection unit 20 of the present embodiment comprises reflection members 42 having the reflection surfaces 85, 86 each of which is formed in a planar shape. The reflection surfaces 85, 86 reflect incident light.

Each of the reflection members 42 performs the revolution and the rotation simultaneously. The direction of the revolution of the reflection member 42 and the direction of the rotation of the reflection member 42 are the same. The angular velocity of the revolution of the reflection member 42 is equal to twice the angular velocity of the rotation of the reflection member 42.

As a result, the reflection position of the light relative to the incident light is constant in regards to the reflection member 42, and the reflection position of the light is prevented from fluctuating. Accordingly, the distortion of scanning can be reduced. In comparison with the mirror galvanometer, the deflection is realized by rotation of the reflection member 42 instead of reciprocating motion. Therefore, it is easy to perform the scanning at a constant speed.

In the reflection unit 20 of this embodiment, the reflection surfaces 85, 86 are arranged in pairs across the rotation axis of the reflection member 42.

The reflection member 42 changes its orientation by rotating 180° for every 360° of the revolution. The reflection surfaces 85, 86, whose orientations are 180° different from each other, are arranged in pairs on the reflection member 42. As a result, when the reflection member 42 crosses the light path of the incident light, one of the two reflection surfaces effectively reflects the light. Accordingly, the incident light can be efficiently guided to the workpiece 200.

The reflection unit 20 of the present embodiment is provided with three reflection members 42. The revolution axes of the three reflection members 42 are coincident. The three reflection members 42 are arranged to divide the circle centered on the revolution axis at equal angular intervals.

This allows the incident light to be directed to the workpiece 200 with even greater efficiency.

The reflection unit 20 of the present embodiment comprises the planetary gear train. The planetary gear train causes the reflection members 42 to perform the revolution and the rotation.

As a result, a complex operation combining the revolution and the rotation of the reflection members 42 can be realized with a simple configuration.

In the reflection unit 20 of the present embodiment, the reflection member 42 reflects the light so as to deflect the light along a plane perpendicular to the rotation axis, as shown in FIG. 3. This plane is offset in the direction of the rotation axis with respect to the incident light which enters into the reflection member 42.

This allows for a layout in which the reflected light reflected by the reflection member 42 does not interfere with an optical member or the like used to guide the incident light to the reflection unit 20.

In the present embodiment, the first reflection surface 85 and the second reflection surface 86 are formed on each of the reflection members 42. The first reflection surface 85 is formed in a planar shape inclined with respect to a plane perpendicular to the rotation axis of the reflection member 42. The second reflection surface 86 is formed in a planar shape inclined with respect to a plane perpendicular to the rotation axis of the reflection member 42. The direction in which the first reflection surface 85 is inclined with respect to the plane perpendicular to the rotation axis and the direction in which the second reflection surface 86 is inclined with respect to the plane perpendicular to the rotation axis are opposite. The incident light is reflected by the first reflection surface 85 and then reflected by the second reflection surface 86. The first reflection surface 85 and the second reflection surface 86 are formed to be symmetrical to each other with respect to the symmetry plane 87. The mirror image of the symmetry plane 87 with respect to the first reflection surface 85 and the mirror image of the symmetry plane 87 with respect to the second reflection surface 86 are identical to each other and in the plane 88. The rotation axis of the reflection member 42 is included in the plane 88 of the mirror images.

This allows for a simple configuration in which the incident light is reflected while offset at the reflection member 42 and the reflection position of the light with respect to the incident light is constant in regards to the reflection member 42.

In the light guide device 13 of the present embodiment, the angle θ at which the first reflection surface 85 is inclined with respect to the plane perpendicular to the rotation axis is 45°. The angle θ at which the second reflection surface 86 is inclined with respect to the plane 88 perpendicular to the rotation axis is 45°.

This allows for a simple configuration of the reflection member 42.

The light guide device 13 of the present embodiment includes the reflection unit 20 of the above-described configuration. The incident light is deflected by the reflection unit 20 to scan the workpiece 200.

This allows for scanning with minimal distortion.

The light guide device 13 of the present embodiment includes the scanning lens 53. The scanning lens 53 is placed on the light path from the reflection member 42 to the scanning area 31.

This allows the focal distance to be aligned over the entire scanning area. Also, the light can be guided to the scanning lens 53 in an ideal state.

Next, a first modification of the drive mechanism of the support plate 41 and the reflection member 42 will be described. In the description of this modification, members identical or similar to those of the above-described embodiment are given the same reference numerals on the drawing, and descriptions thereof may be omitted.

Figure 9:
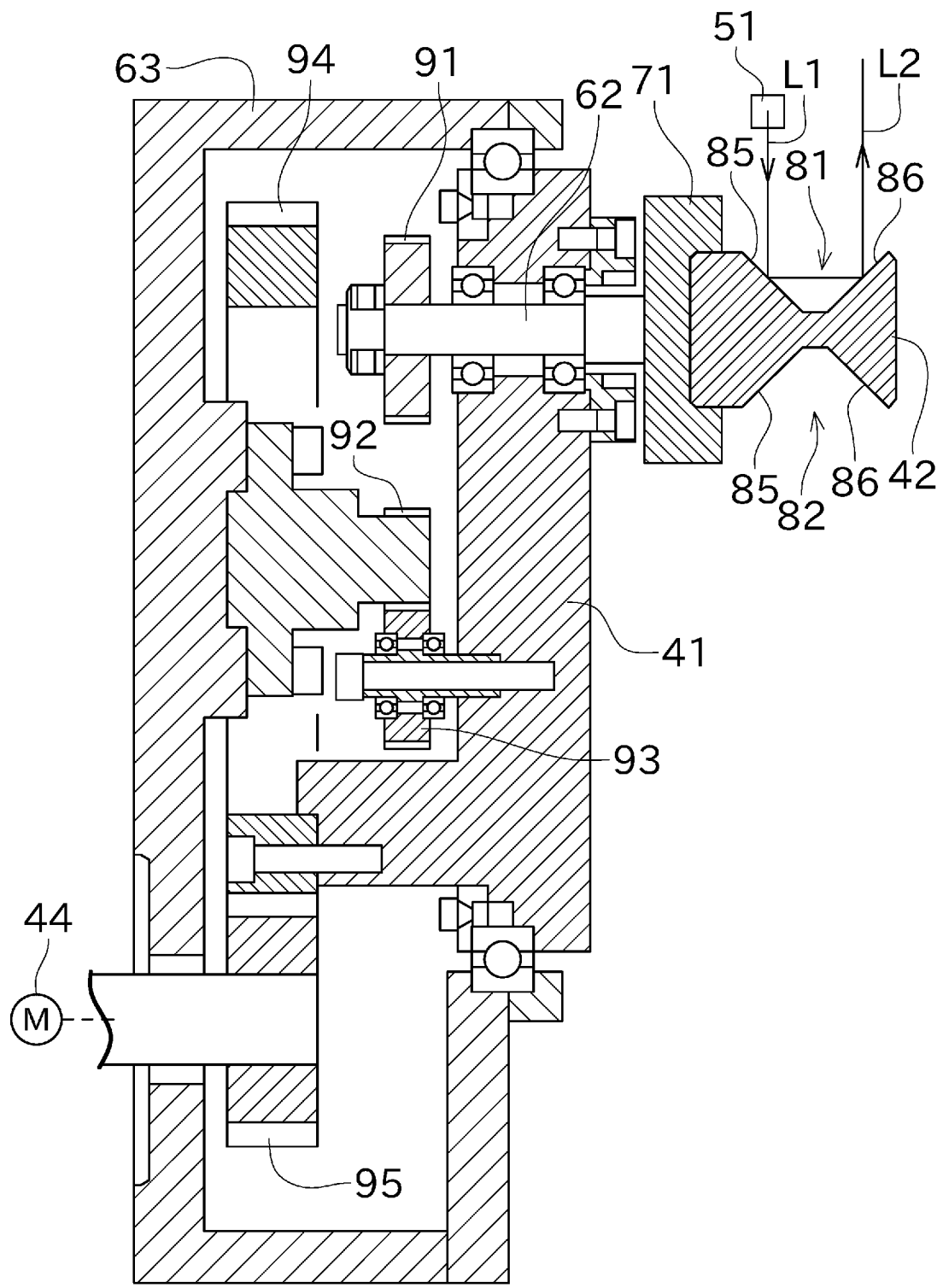
FIG. 9 is a cross-sectional view showing a first modification of the reflection unit.

In the modification shown in FIG. 9, a ring gear 94 is fixed near the outer circumference of the support plate 41. The ring gear 94 meshes with a drive gear 95 fixed to the output shaft of the motor 44. The rest of the configuration is substantially the same as in FIG. 4.

In this modification, the support plate 41 can also be rotated by driving the motor 44 to cause the reflection member 42 to perform the revolution and the rotation.

Next, a second modification of the drive mechanism for the support plate 41 and the reflection member 42 will be described. In the description of this modification, members identical or similar to those of the above-described embodiment are given the same reference numerals on the drawing, and descriptions thereof may be omitted.

Figure 10:
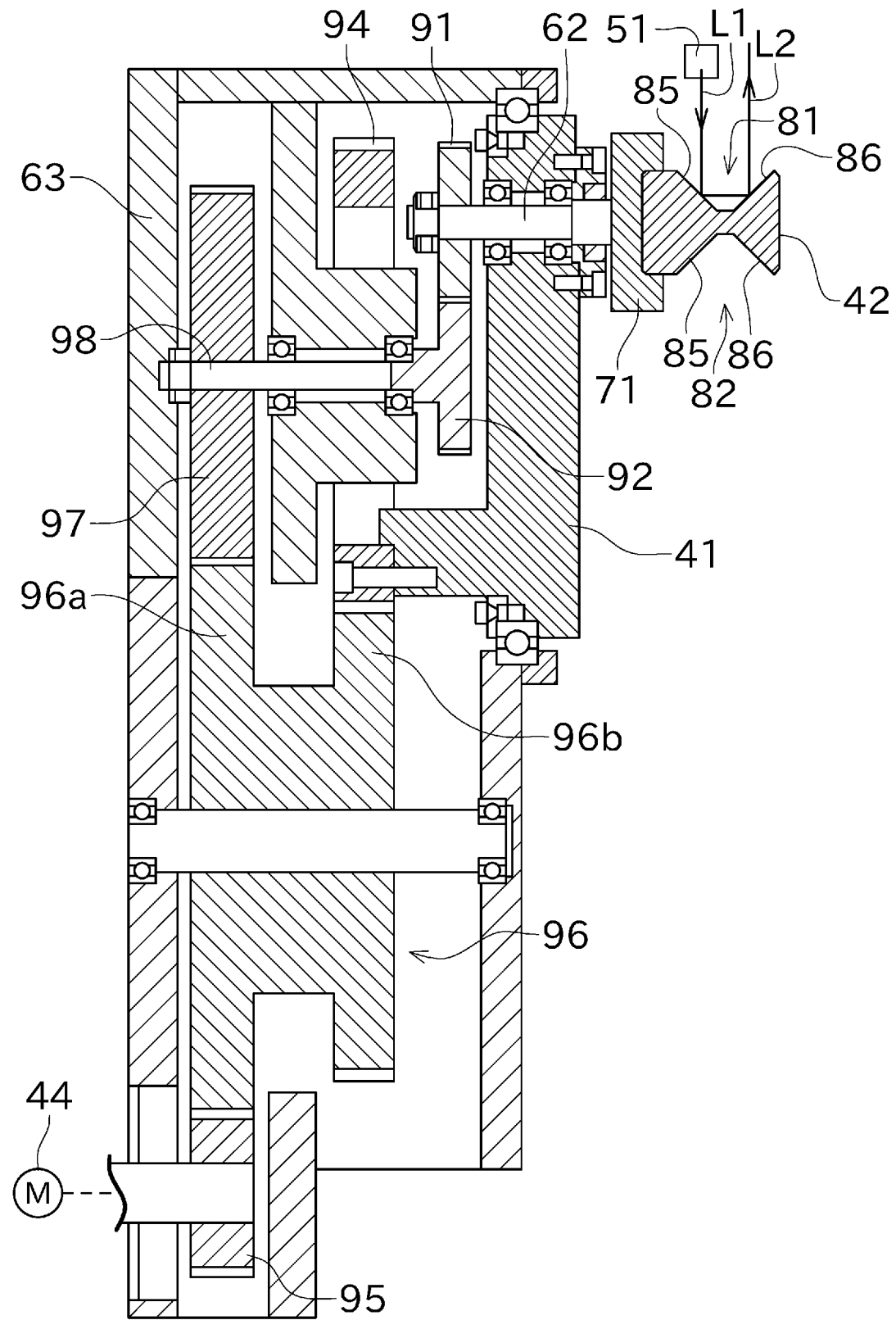
FIG. 10 is a cross-sectional view showing a second modification of the reflection unit.

In the modification shown in FIG. 10, as similar as in FIG. 9, a ring gear 94 is fixed near the outer circumference of the support plate 41.

A two-diameter gear 96 is rotatably supported inside the housing 63. The two-diameter gear 96 includes a large diameter gear 96a and a small diameter gear 96b. The large diameter gear 96a and the small diameter gear 96b rotate integrally with each other. The large diameter gear 96a meshes with a drive gear 95 fixed to the output shaft of the motor 44. The small diameter gear 96b meshes with the ring gear 94.

A transmission gear 97 is rotatably supported in the housing 63. The transmission gear 97 meshes with the large diameter gear 96a included by the two-diameter gear 96.

Unlike the above-described embodiment and the like, the sun gear 92 is rotatably supported by the housing 63. A transmission gear 97 is connected to the sun gear 92 via a transmission shaft 98. The sun gear 92 rotates integrally with the transmission shaft 98.

In this modification, the counter gear 93 is omitted. The sun gear 92 is directly engaged with the planetary gear 91 without the counter gear 93.

With this configuration, when the motor 44 is driven, the two-diameter gear 96 rotates. As a result, the ring gear 94 is driven by the small diameter gear 96b, and the support plate 41 rotates. At the same time, the transmission gear 97 is driven by the large diameter gear 96a, and the sun gear 92 rotates.

The sun gear 92 rotates at greater angular velocity than the support plate 41 and in the same direction as the support plate 41. As a result, the planetary gear 91 can perform the rotation in the same direction as the revolution. By determining the number of teeth of the two-diameter gear 96 or the like according to a known formula, the configuration can be made to perform the revolution and the rotation simultaneously so that the angular velocity of the revolution of the reflection member 42 is twice the angular velocity of the rotation.

Next, with reference to FIGS. 11 and 12, a second embodiment of the light guide device 13 will be described. In the description of this embodiment, members identical or similar to those of the above-described embodiment are given the same reference numerals on the drawing, and descriptions thereof may be omitted.

The present embodiment differs from the first embodiment in that the light guide device 13 comprises a plurality of reflection units 20. This embodiment is used, for example, to process a workpiece 200 that is longer in the main scanning direction than the first embodiment.

Figure 11:
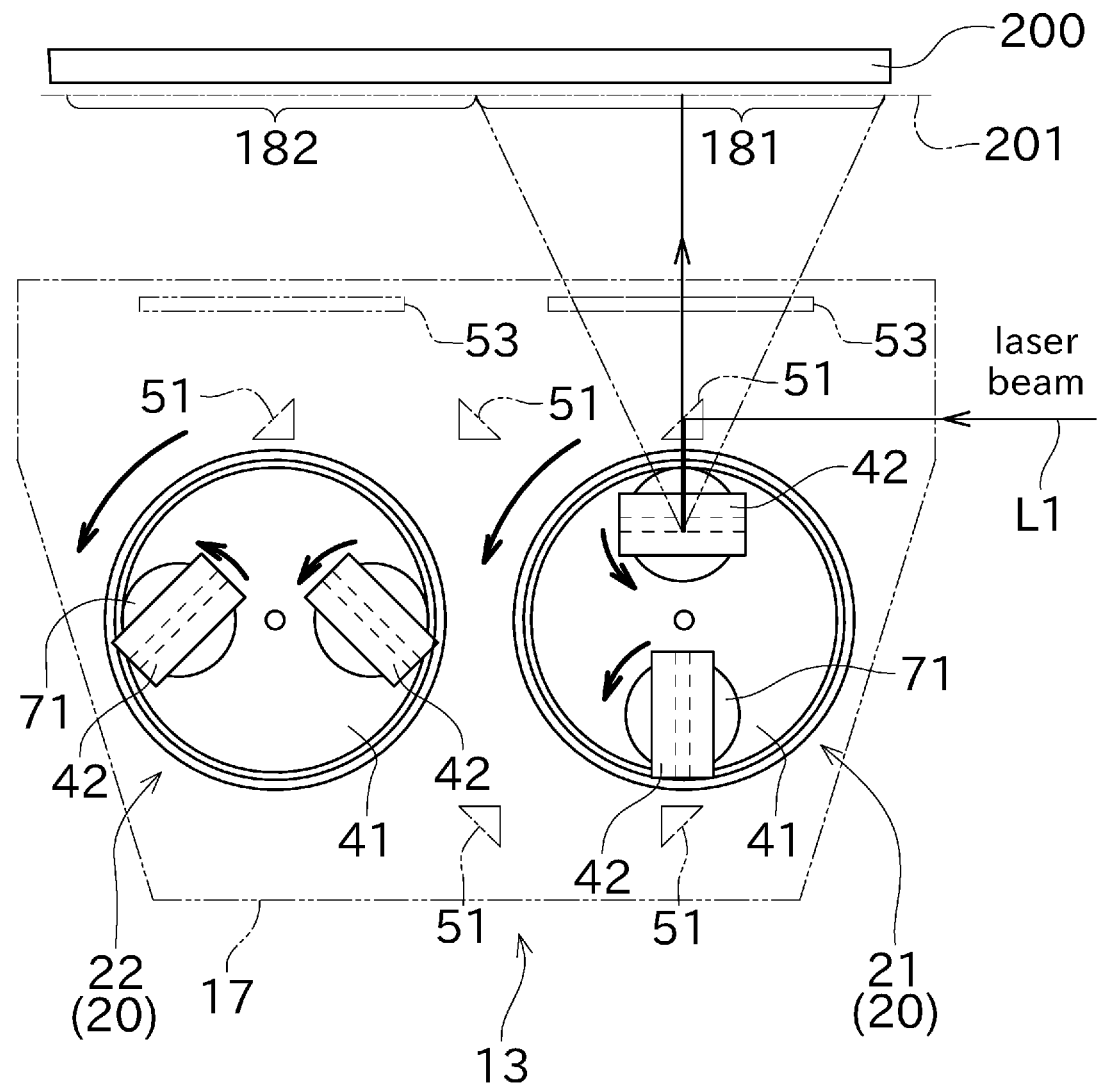
FIG. 11 is a diagram showing a light guide device according to a second embodiment when the first reflection unit is in a reflecting state.
Figure 12:
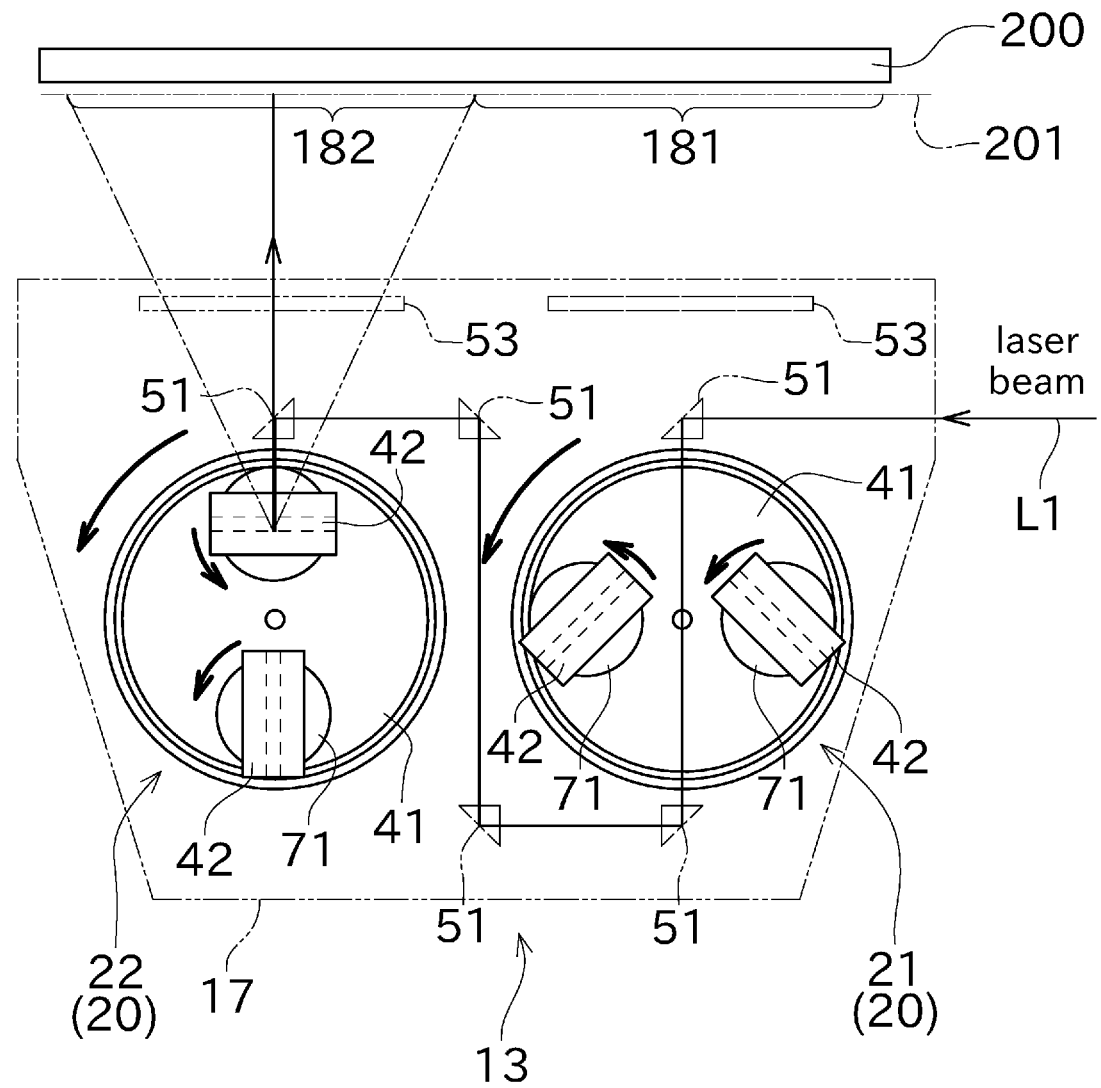
FIG. 12 is a diagram showing a situation where the first reflection unit has changed to a passing state and the second reflection unit has changed to a reflecting state, from the situation in FIG. 11.

As shown in FIG. 11 and FIG. 12, the light guide device 13 is provided with a plurality of the reflection units 20. Two reflection units 20 are placed in the light guide device 13 of this embodiment. Each of the reflection units 20 reflects a laser beam incident from the laser generator 12 and guides it to the workpiece 200.

The two reflection units 20 are lined up in a straight line along the main scanning direction. The direction in which the reflection units 20 are lined up also corresponds to the longitudinal direction of the scanning line 201. Each of the two reflection units 20 is disposed at a position where the distance from the scanning line 201 is substantially equal.

Hereafter, with respect to the plurality of reflection units 20, the reflection unit 20 located upstream side in the traveling direction of the incident light (the side which is close to the laser generator 12) may be referred to as a first reflection unit 21. The reflection unit 20 located downstream side in the traveling direction of the incident light (the side which is far from the laser generator 12) may be referred to as a second reflection unit 22.

Each of the reflection units 20 can scan optically by reflecting and deflecting the laser beam. The area (scanning area) 181 in which the workpiece 200 is optically scanned by the first reflection unit 21 is different from the scanning area 182 by the second reflection unit 22. The two scanning areas 181, 182 are located in a straight arrangement. A set of the two scanning areas 181, 182 constitutes a scanning line 201.

Each of the reflection units 20 can be iteratively switched between a reflecting state, in which it reflects the incident light and performs scanning, and a passing state, in which it does not reflect the incident light and passed the light downstream. When the reflection unit 20 is in the reflecting state, the corresponding scanning area (e.g., the scanning area 181 in the case of the first reflection unit 21) is scanned by light. When the reflection unit 20 is in the passing state, the corresponding reflection unit 20 does not perform the light scanning.

Timing at which each of the reflection units 20 is in the reflecting state differs among the plurality of the reflection units 20. As a result, the plurality of scanning areas are scanned respectively by switching the reflection units 20 that enter the reflecting state.

In the present embodiment, two reflection members 42 are provided for one reflection unit 20. The two reflection members 42 are respectively arranged to divide 360° equally in the support plate 41. Specifically, the two reflection members 42 are disposed such that one reflection member 42 is displaced 180° with respect to the other reflection member 42 in the circumferential direction of the support plate 41.

On the support plate 41, the two reflection members 42 are disposed at positions corresponding to mutually opposite sides of a regular polygon (specifically, a regular quadrilateral). Accordingly, in the two reflection members 42, the central angle corresponding to one of the reflection members 42 is 90°. The reflection member 42 is not disposed at a position corresponding to a side other than the above-described opposing sides.

When the two reflection members 42 each move in accordance with the rotation of the support plate 41, the state in which the reflection member 42 is hit by the laser beam which enters into the reflection unit 20 and travels along the first light path L1 and the state in which the reflection member 42 is not hit by the laser beam are alternately switched. As shown in the first reflection unit 21 in FIG. 11, the state in which any of the two reflection members 42 is hit by the incident light is the reflecting state described above. As shown in the first reflection unit 21 of FIG. 12, the state in which none of the two reflection members 42 is hit by the incident light is the passing state described above.

The first light path L1 is orthogonal to the first rotation shaft 61 and the second rotation shaft 62. The two reflection members 42 are arranged with a phase difference of 180° with respect to each other. Accordingly, of the two reflection members 42 placed across the first rotation shaft 61, only the reflection member 42 positioned on the side close to the upstream side of the first light path L1 is to be hit by the incident light.

The light guide device 13 of the present embodiment is constituted by the two reflection units 20 configured as described above being provided for the incident light traveling from the laser generator 12 through appropriate prisms 51. In the two reflection units 20, the revolution axis and the rotation axis of the reflection members 42 are parallel to each other. The reflection members 42 perform the revolution and the rotation in the same direction. The angular velocity of the revolution of the reflection member 42 is equal to twice the angular velocity of the rotation of the reflection member 42.

The reflection members 42 each perform the revolution with angular velocity equal to that of the revolution of the reflection member 42 in the other reflection unit 20, in the same direction, and with a predetermined angular difference of the rotational phase (90° in this embodiment). This allows the timing at which the reflection member 42 is hit by the incident light to be different between the two reflection units 20.

The above-described revolution and rotation of the reflection members 42 in the plurality of reflection units can be realized, for example, by controlling the motors (not shown) provided by each of the two reflection units 20 to rotate synchronously. However, for example, the two reflection units 20 can also be driven by a common motor.

FIG. 11 shows a case in which, of the two reflection units 20, the first reflection unit 21 enters the reflecting state and the second reflection unit 22 enters the passing state. FIG. 12 shows a case in which, as a result of the revolution and the rotation of the reflection members 42 of each reflection unit 20 from the state of FIG. 11, the first reflection unit 21 enters the passing state and the second reflection unit 22 enters the reflecting state. In this way, the reflection unit 20 that performs light scanning can be switched sequentially to realize light scanning along the scanning line 201 that is longer than the first embodiment as a whole.

As described above, in the laser processing device 1 of the present embodiment, the reflection members 42 of the reflection unit 20 perform the revolution and the rotation simultaneously, so that the light guide device 13 is switched between the reflecting state in which the reflection surface 85 reflects the incident light by being hit by the incident light and the passing state in which the reflection surface 85 lets the incident light pass through without being hit by the incident light. The timing of being in the reflecting state differs among the plurality of light guide devices 13. The single straight scanning line 201 is formed by the set of scanning areas 181, 182 corresponding to the plurality of light guide devices 13.

This allows scanning along a long scanning line to be realized.

Next, with reference to FIG. 13, a rotation mirror 250, which is a specially shaped reflection member, will be described. In the description of this embodiment, members identical or similar to those of the above-described embodiment are given the same reference numerals on the drawing, and descriptions thereof may be omitted.

The rotation mirror 250 includes a first regular polygon pyramid 251 and a second regular polygon pyramid 252. In this embodiment, the two regular polygonal pyramids 251, 252 are formed as regular octagonal pyramids, but are not limited thereto.

The two regular polygonal pyramids 251, 252 are arranged facing each other with their axes 260 coinciding with each other. The two regular polygonal pyramids 251, 252 are coupled to each other by an intermediate portion 255. Accordingly, each of the two regular polygonal pyramids 251, 252 is formed in a substantially polygonal trapezoidal pyramid shape.

A transmission shaft 259 is attached to the rotation mirror 250. By transmitting a driving force of a drive unit which is not shown (specifically, a motor) to this transmission shaft 259, the rotation mirror 250 rotates. The rotation mirror 250 and the drive unit constitute a reflecting device that reflects light while deflecting the light. A rotation axis is coincident with the axis 260 of the two regular polygonal pyramids 251, 252.

The sides of the two regular polygonal pyramids 251, 252 are light reflection surfaces 257 each of which is formed in a planar shape. The light reflection surfaces 257 are arranged side by side around the axis 260. Each of the light reflection surfaces 257 is inclined with respect to the axis 260.

The first regular polygon pyramid 251 includes a first base surface 261. The second regular polygon pyramid 252 includes a second base surface 262. The first base surface 261 and the second base surface 262 are regular polygons and are perpendicular to the axis 260.

In this embodiment, the first regular polygon pyramid 251 and the second regular polygon pyramid 252 are identical in shape. Since the two regular polygonal pyramids 251, 252 are regular octagonal pyramids, the first base surface 261 and the second base surface 262 are both regular octagons. Therefore, the number of sides of the regular polygon is equal between the first base surface 261 and the second base surface 262.

The two regular polygonal pyramids 251, 252 are coupled by an intermediate portion 255 such that the phases of the regular octagons that the two base surfaces 261, 262 have are matched with each other.

Figure 13:
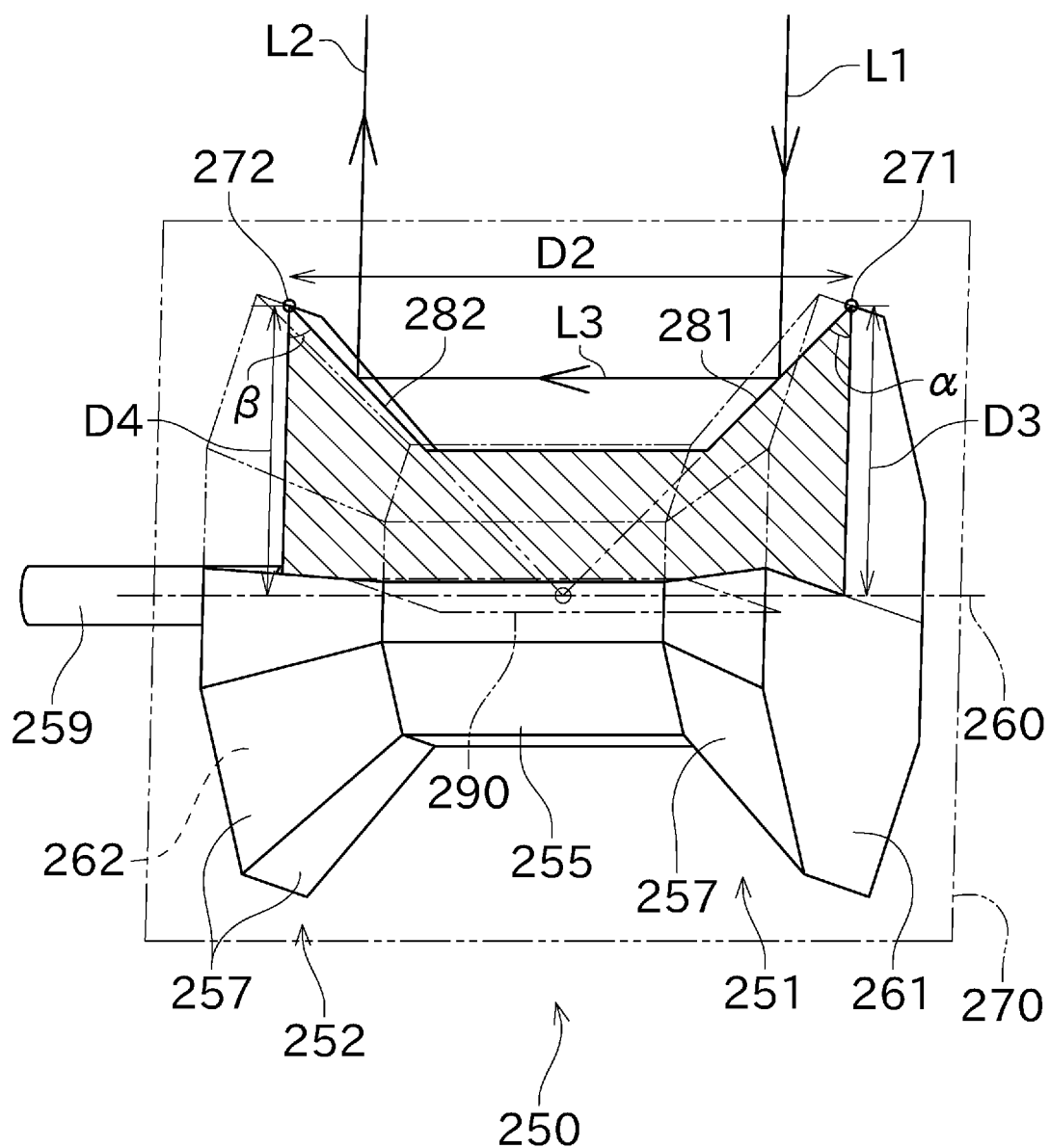
FIG. 13 is a diagonal view of a rotation mirror according to a third embodiment.

FIG. 13 shows a virtual plane 270 along which the rotation mirror 250 is cut. This virtual plane 270 is defined to include the axis 260 and to include the midpoints 271, 272 of one of the sides of the regular octagon of the base surfaces 261, 262.

When the base angle in the case which the first regular polygon pyramid 251 is cut along the virtual plane 270 is defined as $\alpha$, and the base angle when the second regular polygon pyramid 252 is cut along the virtual plane 270 is defined as $\beta$, the relationship $\alpha+\beta=90°$ is established in the rotation mirror 250 of the present embodiment. In the present embodiment, $\alpha=\beta=45°$, but this is not limited thereto. For example, the relationship may be $\alpha=30°$ and $\beta=60°$, and the like.

When the distance between the first base surface 261 and the second base surface 262 is defined as D2, the distance between the midpoint 271 of one side of the regular polygon of the first base surface 261 and the axis 260 is defined as D3, and the distance between the midpoint 272 of one side of the regular polygon of the second base surface 262 and the axis 260 is defined as D4, the relationship D2=D3×tan $\alpha$+D4×tan $\beta$ is established in the present embodiment.

With the above configuration, when considering the contour of the rotation mirror 250 which is cut along the virtual plane 270, the straight line 281 corresponding to the light reflection surface 257 of the first regular polygon pyramid 251 and the straight line corresponding to the light reflection surface 257 of the second regular polygon pyramid 252 are perpendicular to each other.

Furthermore, since the relationship of the above equation is established between the distances D2, D3, and D4, if the two straight lines 281 and 282 are extended as shown by the chain lines in FIG. 13, their intersection point will be located on the axis 260. This is evident by considering two right-angled triangles and the relationship between tan $\alpha$ and tan $\beta$.

By the way, in the reflection member 42 of FIG. 6 in the aforementioned embodiment, the rotation axis is arranged to be included in the virtual plane 88, which is the apparent reflection surface of the light. The configuration of the rotation mirror 250 of FIG. 13 is an extension of the above idea to a regular polygonal pyramid mirror.

In the rotation mirror 250 of FIG. 13, consider a case where the light is irradiated from an irradiation device to a light reflection surface 257 so as to intersect an axis 260. The incident light (e.g., laser beam) is reflected by the light reflection surface 257 of the first regular polygon pyramid 251, and then reflected by the light reflection surface 257 of the second regular polygon pyramid 252, and then emitted.

Each of the light reflection surfaces 257 disposed on a side of the rotation mirror 250 can be associated with a respective side of the regular polygon in the base surfaces 261, 262. In the following, the side of the regular polygon described above that corresponds to the light reflection surface 257 that is hit by the light may be referred to as a corresponding side.

Here, virtually consider a plane 290 of zero thickness that is located to include the axis 260 and rotates with the rotation mirror 250. This plane 290 is parallel to the corresponding side described above. Deflecting the incident light by two reflections with the rotation mirror 250 including a pair of regular polygonal pyramid portions is equivalent to deflecting the incident light by one reflection by the plane 290.

Accordingly, the reflection position of the light relative to the incident light is constant in regards to the rotation mirror 250. As a result, it is possible to prevent the reflection position of the light from fluctuating.

In the present embodiment, the rotation mirror 250 is simply rotated via the transmission shaft 259, and the axis 260, which is the center of rotation, is not moved. In the present embodiment, a large-scale rotating device that combines the revolution and the rotation is unnecessary, so that simplification and downsizing of the configuration can be easily realized.

This rotation mirror 250 can be used, for example, together with the above-described motor 44, the housing 17, the scanning lens 53, the laser generator 12, and the like to configure the light guide device 13 and the laser processing device 1 shown in FIG. 1. As described above, in this laser processing device, the reflection position of the light by the rotation mirror 250 is substantially constant. Therefore, by using an fθ lens as the scanning lens 53, scanning at the irradiated point 202 at a constant speed of the focus point is realized. In comparison with the mirror galvanometer, the deflection is achieved by the rotation of the rotation mirror 250 instead of reciprocating motion. Accordingly, it is easier to perform scanning at a constant speed.

As described above, the laser processing device of the present embodiment is provided with the rotation mirror 250, the motor, and the irradiation device. The motor rotates the rotation mirror 250. The irradiation device irradiates the light onto the rotation mirror 250. The rotation mirror 250 comprises the first regular polygon pyramid 251 and the second regular polygon pyramid 252. The second regular polygon pyramid 252 is arranged facing the first regular polygon pyramid 251 with the axis 260 coincident with the first regular polygon pyramid 251. Side surfaces of each of the first regular polygon pyramid 251 and the second regular polygon 252 are light reflection surfaces 257 each of which is formed in a planar shape. The number of sides of the regular polygons is equal in the first base surface 261 that the first regular polygon pyramid 251 has and the second base surface 262 that the second regular polygon pyramid 252 has. The first base surface 261 and the second base surface 262 are both arranged perpendicular to the axis 260. The first regular polygon pyramid 251 and the second regular polygon pyramid 252 are rotated integrally with each other around the axis 260 as the rotation axis by the motor while the phase of the regular polygon of the first base surface 261 and the phase of the regular polygon of the second base surface 262 are matched with each other. The base angle of the first regular polygon pyramid 251 is defined as $\alpha°$ when the first regular polygon pyramid 251 is cut along a virtual plane 270 that includes the axis 260 and the midpoint 271 of one of the sides of the regular polygon of the first base surface 261. The base angle of the second regular polygon pyramid 252 is $\beta=(90-\alpha)°$ when the second regular polygon pyramid 252 is cut along a virtual plane 270 that includes the axis 260 and the midpoint 272 of one of the sides of the regular polygon of the second base surface 262. The distance D2 between the first base surface 261 and the second base surface 262 is equal to the sum of the distance D3 between the midpoint 271 of one side of the regular polygon of the first base surface 261 and the axis 260 multiplied by tan $\alpha$, and the distance D4 between the midpoint of one side of the regular polygon of the second base surface 262 and the axis 260 multiplied by tan(90−$\alpha$). The irradiation device irradiates the light in a direction intersecting the axis 260 of the rotating mirror 250.

As a result, the reflection position of the light relative to the incident light is constant in regards to the rotation mirror 250, and the reflection position of the light is prevented from fluctuating with rotation. Accordingly, the distortion of scanning can be reduced.

In the light guide device of this embodiment, the base angle $\alpha$ is 45°.

This allows the rotation mirror 250 to have a simple shape. Also, a concise light path layout can be realized.

Although the preferred embodiment and the modifications of the present invention have been described above, the configurations described above may be modified as follows, for example.

The number of the reflection members 42 provided to the support plate 41 in the reflection unit 20 is not limited to three as in the first embodiment, but can be, for example, four or five.

The number of the reflection units 20 can be determined according to the shape of the irradiated object or the like, and can be, for example, three, four, or five instead of two as in the second embodiment.

The first reflector 81 and the second reflector 82 in the reflection member 42 may be realized by a prism.

The optical scanning device to which the light guide device 13 is applied is not limited to the laser processing device 1, but may be, for example, an image forming device.

In the third embodiment, instead of the regular 8-pyramid, for example, a regular 6-pyramid, a regular 9-pyramid, or the like can be used as the first regular polygon pyramid 251 and the second regular polygon 252. The sizes of the first base surface 261 and the second base surface 262 can be configured to be different from each other.

In the rotation mirror 250 of the third embodiment, any shape can be adopted for the portion that does not reflect light. Although the first regular polygon pyramid 251 and the second regular polygon pyramid 252 shown in FIG. 13 are actually regular polygonal trapezoidal pyramid shapes, they are included in the regular polygonal pyramid as long as the portions that reflect light are regular polygonal pyramid shapes. The designations "base surface" and "base angle" are not intended to limit the orientation of the regular polygonal pyramid. The rotation mirror 250 may be used with its axis 260 in any orientation.

In view of the foregoing teachings, it is apparent that the present invention can take many modified and variant forms. Accordingly, it is to be understood that the present invention may be practiced in ways other than those described herein within the scope of the appended claims.

DESCRIPTION OF THE REFERENCE NUMERALS 1 laser processing device (optical scanning device)
13 light guide device
20 reflection unit (light reflection device)
31 scanning area
42 reflection member 53 scanning lens
61 first rotation shaft (rotation axis of support plate)
62 second rotation shaft (rotation axis of reflection member)
81 first reflector (reflector)
82 second reflector (reflector)
85 first reflection surface
86 second reflection surface
200 workpiece (object to be irradiated)
201 scanning line
202 irradiated point
250 rotation mirror (reflection member)
251 first regular polygon pyramid
252 second regular polygon pyramid
257 light reflection surface
260 axis (rotation axis)
261 first base surface
262 second base surface
α, β base angle

The invention claimed is:

1. A light reflection device, comprising:
a reflection member having a reflection surface that is formed in a planar shape to reflect incident light, the reflection member performing a revolution and a rotation simultaneously,
wherein a direction of the revolution of the reflection member and a direction of the rotation of the reflection member are the same, and
wherein angular velocity of the revolution of the reflection member is equal to twice angular velocity of the rotation of the reflection member.

2. The light reflection device according to claim 1, wherein the reflection surfaces are arranged in pairs across a rotation axis of the reflection member.

3. The light reflection device according to claim 1, further comprising:
a plurality of the reflection members,
wherein revolution axes of the plurality of the reflection members are coincident, and
the plurality of the reflection members are arranged to divide a circle centered on the revolution axis at equal angular intervals.

4. The light reflection device according to claim 1, further comprising:
a planetary gear train causing the reflection member to perform the revolution and the rotation.

5. The light reflection device according to claim 1, wherein the reflection member reflects light so as to deflect the light along a plane perpendicular to a rotation axis and wherein the plane is offset in a direction of the rotation axis with respect to the incident light which enters into the reflection member.

6. The light reflection device according to claim 5, wherein the reflection surface includes:
a first reflection surface formed in a planar shape inclined with respect to a plane perpendicular to the rotation axis; and
a second reflection surface formed in a planar shape inclined with respect to a plane perpendicular to the rotation axis,
wherein a direction in which the first reflection surface is inclined with respect to the plane perpendicular to the rotation axis and a direction in which the second reflection surface is inclined with respect to the plane perpendicular to the rotation axis are opposite,
wherein the incident light is reflected by the first reflection surface and then reflected by the second reflection surface,
wherein the first reflection surface and the second reflection surface are formed to be symmetrical to each other with respect to a symmetry plane,
wherein a mirror image of the symmetry plane with respect to the first reflection surface and a mirror image of the symmetry plane with respect to the second reflection surface are identical to each other and in a plane, and
wherein the rotation axis is included in the plane of the mirror images.

7. The light reflection device according to claim 6, wherein an angle at which the first reflection surface is inclined with respect to the plane perpendicular to the rotation axis is 45° and wherein an angle at which the second reflection surface is inclined with respect to the plane perpendicular to the rotation axis is 45°.

8. A light guide device, comprising:
a light reflection device includes a reflection member having a reflection surface that is formed in a planar shape to reflect incident light, the reflection member performing a revolution and a rotation simultaneously,
wherein a direction of the revolution of the reflection member and a direction of the rotation of the reflection member are the same,
wherein angular velocity of the revolution of the reflection member is equal to twice angular velocity of the rotation of the reflection member; and
wherein the incident light is deflected by the light reflection device to scan an object to be irradiated.

9. The light guide device according to claim 8, further comprising:
a scanning lens placed on a light path from the reflection member to the object to be irradiated.

10. An optical scanning device, comprising:
a plurality of light guide devices according to claim 8,
wherein in each of the light guide devices, the reflection member of the light reflection device performs the revolution and the rotation simultaneously so that the light guide device is switched between a reflecting state in which the reflection surface reflects the incident light by being hit by the incident light and a passing state in which the reflection surface lets the incident light pass through without being hit by the incident light,
wherein timing of being in the reflecting state differs among the plurality of the light guide devices, and
wherein a single straight scanning line is formed by a set of scanning areas corresponding to a plurality of the light guide devices.

11. An optical scanning device, comprising:
a rotation mirror;
a drive unit for rotating the rotation mirror; and
an irradiation device that irradiates light onto the rotation mirror,
wherein the rotation mirror comprises:
a first regular polygon pyramid; and
a second regular polygon pyramid arranged facing the first regular polygon pyramid with an axis coincident with the first regular polygon pyramid,
wherein side surfaces of each of the first regular polygon pyramid and the second regular polygon pyramid are light reflection surfaces each of which is formed in a planar shape,
wherein the number of sides of regular polygons is equal in a first base surface that the first regular polygon pyramid has and a second base surface that the second regular polygon pyramid has, wherein the first base surface and the second base surface are both arranged perpendicular to the axis, wherein the first regular polygon pyramid and the second regular polygon pyramid are rotated integrally with each other around the axis as a rotation axis by the drive unit while a phase of the regular polygon of the first base surface and a phase of the regular polygon of the second base surface are matched with each other, wherein a base angle of the first regular polygon pyramid is $\alpha°$ when the first regular polygon pyramid is cut along a plane that includes the axis and a midpoint of one of the sides of the regular polygon of the first base surface, wherein a base angle of the second regular polygon pyramid is $(90-\alpha°)$ when the second regular polygon pyramid is cut along a plane that includes the axis and a midpoint of one of the sides of the regular polygon of the second base surface, wherein a distance between the first base surface and the second base surface is equal to the sum of a distance between the midpoint of one side of the regular polygon of the first base surface and the rotation axis multiplied by $\tan \alpha$ and a distance between the midpoint of one side of the regular polygon of the second base surface and the rotation axis multiplied by $\tan(90-\alpha)$, and wherein the irradiation device irradiates the light toward a position so that the light intersects the rotation axis of the rotation mirror.

12. The optical scanning device according to claim 11, wherein the base angle $\alpha°$ is 45°.

* * * * *